Aug. 24, 1954  A. H. VALENTINE  2,687,001
MOWER ATTACHMENT
Filed Sept. 11, 1953

INVENTOR.
ARTHUR H. VALENTINE
BY
John H. Widdowson
ATTORNEY

Patented Aug. 24, 1954

2,687,001

UNITED STATES PATENT OFFICE 2,687,001

MOWER ATTACHMENT

Arthur H. Valentine, Douglass, Kans.

Application September 11, 1953, Serial No. 379,657

8 Claims. (Cl. 56—299)

This invention relates to mowers, particularly mowers employing reciprocating sickle bars. In a more specific aspect, this invention relates to an attachment for a mower whereby plugging and clogging of the assembly aperture in the outer shoe of the mower cutter bar is prevented.

This application discloses and claims mower attachment means which are an improvement over those mower attachment means disclosed and claimed in my co-pending application Serial No. 273,189.

In present mowers of the reciprocating sickle bar type, material tends to accumulate in the assembly aperture of the outer shoe of the mower cutter bar during the cutting operation, thereby plugging and clogging the aperture. Grass, weeds, or other material being cut, gets into the outer shoe aperture during the cutting operation and becomes interlocked, entwined, and the like, resulting in the plugging and clogging of the aperture, and making it necessary to periodically clean out the aperture, and usually this is done by a rather dangerous hand operation. Such plugging and clogging results in a loss of time, inefficient cutting, breaking of mower parts, and the like, and is therefore a serious and vexing problem. Much time and effort has been expended in an attempt to solve this problem of the plugging and clogging of the outer shoe aperture, but no satisfactory solution had been obtained prior to my invention. The means of my invention disclosed herein has been very successful commercially and has been accepted in the industry.

I have invented anti-clogging means for a mower having a sickle bar which reciprocates through the outer shoe of the mower. The anti-clogging means of my invention is an arm member having a forward portion adapted for mounting on the sickle bar to reciprocate therewith. A rear portion extends upwardly and rearwardly from the forward portion. This rear portion has a fin projecting therefrom, preferably being turned down along its outer edge to form a downwardly projecting fin. The arm member reciprocates with the sickle bar during operation and passes back and forth through the outer shoe aperture to keep foreign material out of same. The downward projecting fin portion resulting from inwardly flanging the outer edge of the rear portion of the arm member creates relatively high velocity air currents within the outer shoe aperture during reciprocation of the sickle bar. I have found that this keeps grass, weeds, or other material being cut by the mower, from falling into the aperture and becoming entwined and interlocked therein, and in general plugging up the aperture. In addition, foreign material of any nature is removed from the aperture should such fall therein. The use of the anti-clogging means of my invention makes possible the saving of much time in the cutting operation in that stops for the purpose of removing accumulated foreign material from the aperture in the outer shoe are eliminated. Also, time presently consumed in repairing parts broken as a result of the plugging and clogging of the aperture is saved. Further, a great saving in cost of operation is realized by the use of the anti-clogging means of my invention in that breakage due to plugging and clogging of the assembly aperture is eliminated. The anti-clogging means of my invention can be used to keep the aperture in the outer shoe of any of the common makes of mowers free of foreign material and, a preferred specific embodiment of the device of my invention can be used without interfering with any mower operation or repair procedure, a particularly advantageous adaptation for the common reciprocating mowers for easy removal of the sickle bar from the cutter bar being provided. The anti-clogging means of my invention is efficient to use and easy and economical to manufacture.

It is an object of my invention to provide new anti-clogging means for mowers.

It is another object of my invention to provide anti-clogging means to prevent plugging and clogging of the outer shoe aperture of mowers having a sickle bar reciprocating in said outer shoe aperture during operation.

Still another object of my invention is to provide an easy to use and manufacture attachment for mowers utilizing a reciprocating sickle bar, which makes possible a saving of much time and expense in mowing operations.

Yet another object of my invention is to provide an anti-clogging attachment for a mower having a sickle bar which reciprocates in the aperture of an outer shoe during operation, which can be removably mounted on the sickle bar when same is in operating position on the mower cutter bar.

Other objects and advantages of the anti-clogging means of my invention will become apparent to one skilled in the art upon reading this disclosure.

Drawings accompany and are a part of this disclosure. These drawings depict a preferred specific embodiment of the anti-clogging device of my invention, and it is to be understood that such drawings are not to unduly limit the scope of my invention.

Fig. 1 of the drawings is a perspective view of a portion of a mower cutter bar showing a preferred specific embodiment of the anti-clogging means of my invention mounted in operative position on the mower sickle bar.

Figure 1:
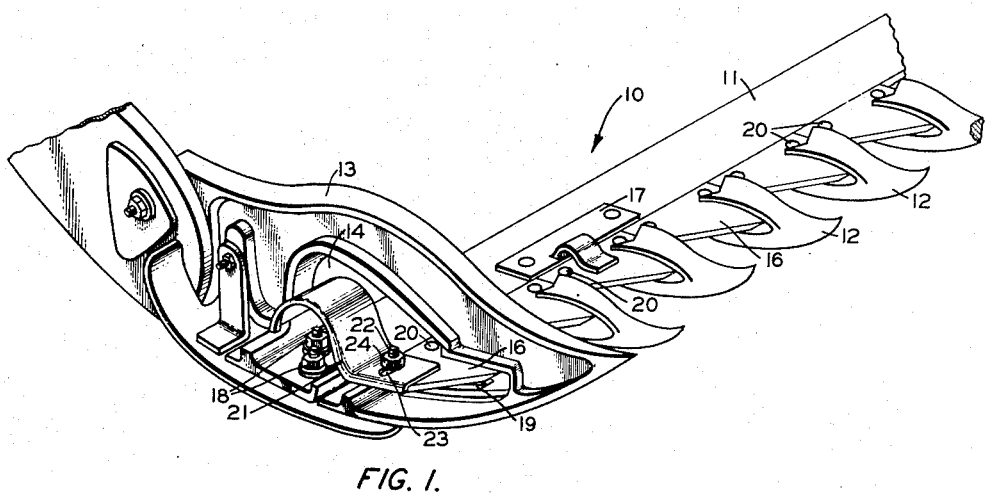
Figure 2:
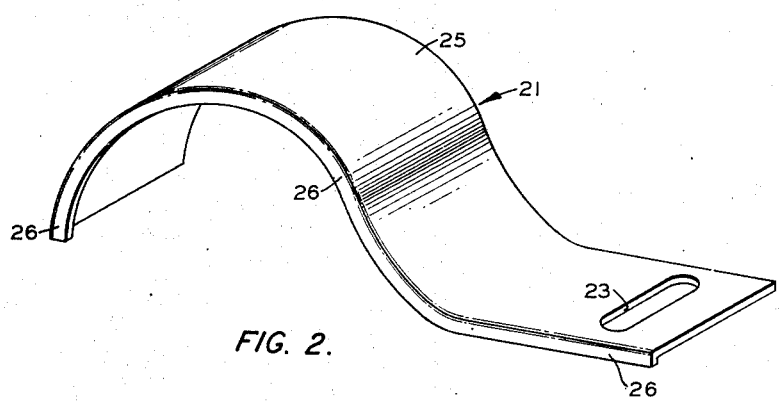
Fig. 2 is an enlarged perspective view of the anti-clogging attachment shown mounted on the mower sickle bar in Fig. 1.
Figure 3:
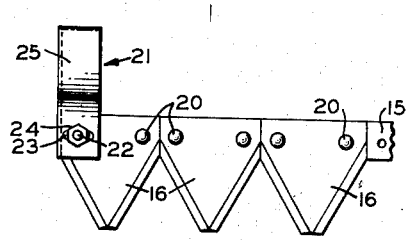
Fig. 3 is a plan view of the anti-clogging attachment mounted on the mower sickle bar, the same arm member shown in Figs. 1 and 2.

Following is a description and discussion of the new anti-clogging means of my invention. Such discussion and description is made with reference to the drawings, and the same reference numerals are used on the several figures of the drawings to indicate the same or similar part or structure. It is to be understood that the following description and discussion is not to unduly limit the scope of my invention.

A mower cutter bar, indicated generally at 10, is comprised of a beam 11, a plurality of finger guards 12 spaced longitudinally along beam 11, an outer shoe 13 mounted on the end of beam 11, shoe 13 having an assembly aperture 14 formed therein, and a sickle bar 15 mounted on beam 11 for reciprocal longitudinal movement thereon, the outer end portion of sickle bar 15 being adapted to be alternately extended and withdrawn through aperture 14 in shoe 13 during its reciprocal movement. A plurality of knife sections 16 are longitudinally spaced along sickle bar 15 and provide the primary cutting means for the mower. Sickle bar 15 is held in position on beam 11 by plate and clip member 17 mounted on beam 11. The outer shoe 13 is mounted on the outer end of beam 11 by nut and bolt assemblies 18, and the outer end knife section 16 in operation moves back and forth across the outer shoe ledger plate 19. The knife sections 16 are usually mounted on sickle bar 15 by the use of rivets 20 passing therethrough.

The anti-clogging means 21 of my invention is mounted on sickle bar 15 on the outer end portion of the outer knife section 16. This can conveniently be done by removing the outer rivet 20 and passing a bolt 22 up through sickle bar 15, outer knife section 16, and up through a hole 23 in the forward end portion of arm member 21. A nut 24 with a lock washer (not shown) can conveniently be used to retain member 21 on bolt 22. Hole 23 is preferably a slot, as shown. I find that this allows my anti-clogging means 21 to be used on the various kinds of mowers available on the market, the distance from the outer rivet 20 to the outer edge of knife section 16 varying from make to make.

The rear portion 25 of arm member 21 preferably extends upwardly and rearwardly from the forward end portion having slot 23 therein and is preferably arcuate. Other suitable shapes can be used, if desired. The forward end portion is preferably flat and can conveniently be made integral with the rear portion 25. Arm member 21 has a fin portion 26 projecting therefrom, preferably resulting as shown from a turned down portion along the length of the outer edge of member 21. Such construction has been found to be very advantageous since the turned down portion along the forward end portion of 21 provides an overhang which fits over the outer edge of the outer knife section 16 to provide for rigid securing of the arm member 21 to the outer end of the sickle bar 15. The fin portion 26 resulting from turning down the outer edge of rear portion 25 sets up relatively high velocity air currents in aperture 14 of shoe 13 upon reciprocation of sickle bar 15 during operation of the mower. This has been found to prevent weeds, grass, or other material being cut, from falling into aperture 14, becoming interlocked and entwined with itself or parts of the outer shoe and sickle bar of the mower assembly, and resulting in plugging and clogging aperture 14 in shoe 13.

The anti-clogging member 21 of my invention can be made of any suitable material and in any suitable manner. I have found it desirable to make it out of relatively strong sheet metal, and have found that it can be formed in one piece easily and economically. The member 21 must be of sufficient size to provide for keeping aperture 14 free of foreign material during operation. I find it preferable that arm member be of such size that when mounted on sickle bar 15 and within outer shoe 13, the uppermost point on the rear portion 25 is a distance from the lower edge of aperture 14 in shoe 13 of from 45% to 85%, more preferably 60% to 75%, of the greatest distance from the lower to the upper edge of aperture 14. Anti-clogging means 21 of a size in these ranges has been found to give excellent results.

It is a simple matter to remove the outer rivet 20 of the outer knife section 16 to provide an aperture to receive the mounting bolt 22 and nut 24. Likewise, it is easy and convenient to remove same for removal of arm member 21, for withdrawing sickle bar 15 from the cutter bar for replacement, repair, etc.

As will be evident to those skilled in the art, various modifications of this invention can be made or followed in the light of this disclosure and discussion, without departing from the spirit or scope of the disclosure or from the scope of the claims.

I claim:

1. Anti-clogging means for the outer shoe of a mower cutter bar having a sickle bar with a plurality of knife sections attached thereto along the length thereof, said sickle bar adapted for reciprocable movement with the outer portion of the outer knife section reciprocably passing through the aperture in said outer shoe, which comprises, an arm member adapted for mounting on said outer portion of said outer knife section and upon reciprocation of said sickle bar for movement through said aperture in said outer shoe to keep said aperture free of foreign material, said arm member being elongated, having a flat end portion and an upwardly and rearwardly projecting arcuate-shaped segment integral therewith, having a transverse elongated slot in said flat end portion to receive a bolt passing through said sickle bar and said outer end portion of said outer knife section, and projecting downwardly on its outer edge along the length thereof, said arm member being of such size that when mounted on said sickle bar and within said outer shoe the uppermost point on said arcuate-shaped segment is a distance from the lower edge of said aperture in said outer shoe of from 60 to 75 per cent of the greatest distance from said lower to the upper edge of said shoe aperture.

2. Anti-clogging means for the outer shoe of a mower cutter bar having a sickle bar with a plurality of knife sections attached thereto along the length thereof, said sickle bar adapted for reciprocable movement with the outer portion of the outer knife section reciprocably passing through the aperture in said outer shoe, which comprises, an arm member having, a forward end portion with a transverse slot therein adapted to receive a bolt to attach said arm member to said outer portion of the outer knife section, an arcuate-shaped portion extending upwardly and rearwardly from said forward portion, and projecting downwardly along its outer edge, said arcuate-shaped portion being of such size that when mounted on said sickle bar and within said outer shoe the uppermost point of said arcuate-shaped portion is a distance from the lower edge of said aperture in said outer shoe of from 45 to 85 per cent of the greatest distance from the lower to the upper edge of said shoe aperture.

3. Anti-clogging means for a mower having a sickle bar which reciprocates through the outer shoe of said mower, which comprises, an arm member having a forward portion adapted for mounting said arm member on said sickle bar to reciprocate therewith, and a rear portion extending upwardly and rearwardly from said forward portion, said rear portion projecting downwardly along its outer edge, and said arm member being adapted to keep the aperture of said outer shoe free of foreign material upon reciprocation of said sickle bar.

4. The apparatus of claim 3 wherein said rear portion is of such size that a point on same is a distance from the lower edge of said aperture of from 45 to 85 per cent of the distance from said lower to the upper edge of said shoe aperture when said rear portion is mounted on said sickle bar and within said outer shoe.

5. Anti-clogging means for a mower having a sickle bar which reciprocates through the outer shoe of said mower, which comprises, an arm member having a forward portion adapted for mounting said arm member on said sickle bar to reciprocate therewith, and a rear portion extending upwardly and rearwardly from said forward portion, said rear portion having a fin projecting therefrom, and said arm member being adapted to keep the aperture of said outer shoe free of foreign material upon reciprocation of said sickle bar.

6. A cutter bar for a mower comprising, in combination, a beam, a shoe secured to the outer end portion of said beam, a sickle bar with a plurality of knife sections attached thereto along the length thereof mounted on said beam and adapted for reciprocable movement with the outer portion of the outer knife section reciprocably passing through the aperture in said shoe, and an arm member mounted on the outer end portion of said sickle bar, said arm member having, a forward end portion with a transverse slot therein receiving a bolt to attach said arm member to said sickle bar, an arcuate-shaped portion extending upwardly and rearwardly from said forward portion, and projecting downwardly along its outer edge, said arcuate-shaped portion being of such size that when within said outer shoe the uppermost point of said arcuate-shaped portion is a distance from the lower edge of said aperture in said outer shoe of from 45 to 85 per cent of the greatest distance from the lower to the upper edge of said aperture.

7. A cutter bar for a mower comprising, in combination, a beam, a shoe secured to the outer end portion of said beam, a sickle bar mounted for reciprocable movement through the aperture in said shoe, and an arm member mounted on said sickle bar for reciprocation therewith, a rear portion of said arm member extending upwardly and rearwardly from said sickle bar, said rear portion projecting downwardly along its outer edge, and said arm member being adapted to keep said aperture of said outer shoe free of foreign material upon reciprocation of said sickle bar.

8. The cutter bar of claim 7 wherein said rear portion is of such size that a point on same is a distance from the lower edge of said aperture of from 45 to 85 per cent of the distance from said lower to the upper edge of said shoe aperture when said rear portion is within said aperture.

No references cited.